INVENTOR
DONALD S. OLIVER

BY
David A. Rich
ATTORNEY

ELECTRO-OPTICAL SYSTEM

Filed Nov. 15, 1966 2 Sheets-Sheet 2

INVENTOR
DONALD S. OLIVER

BY

David A. Rich

ATTORNEY 3,483,515

ELECTRO-OPTICAL SYSTEM

Donald S. Oliver, West Acton, Mass., assignor to Itek Corporation, Lexington, Mass., a corporation of Delaware Filed Nov. 15, 1966, Ser. No. 594,566
Int. Cl. H04q *1/00, 1/18*
U.S. Cl. 340—165 11 Claims This invention relates to electro-optical systems, and more particularly to an electro-optical system for data processing which provides electrical isolation between input and output.

Telephone systems of significant size use very elaborate crossbar switching to channel telephone calls. These systems require electro-mechanical devices, which are inherently slow. Such equipment requires substantial maintenance in that both magnetic circuit contacts and electrical contacts require periodic cleaning. An embodiment of the present invention provides static crossbar switching which is substantially more compact, exceedingly faster, and requires minimum service.

If a relay fails in a crossbar system telephone calls are blocked. To restore telephone service extensive rewiring or immediate investigation is required to locate and eliminate the fault. An embodiment of the present invention contemplates an input matrix wherein an input signal applied to a preselected point on the input matrix is transferred to a corresponding point on the output matrix. Moreover, electronic means between input and output permits the shifting of signals from one point on the output matrix to another point thus providing electronic channel selection for rerouting signals. The ability of a device embodying the principles of the present invention to reroute signals electronically obviates substantial service delays and provides significant improvements in continuity of service over the crossbar system using relays.

In another field, that of data collection, prior art devices quite frequently employed a number of separate switches together with a multiplicity of channels for transferring accumulated data to a common utilization point. An embodiment of the present invention permits one to accumulate data swiftly and reliably through a single channel, thereby providing considerable economy.

Another embodiment of the present invention contemplates the receiving of a group of words in digital form row by row at the input matrix and reading out these words column by column at the output matrix. If the first digit of each word represents some common quality of each word immediate correlation of all the words with one another can be obtained by read-out of the first column at right angles to read-in.

The present invention envisions in a preferred embodiment an input section that is electro-luminescent and an output section that is photoconductive. The input and output sections are separated by an electrically non-conducting medium. The data transfer between the input and output utilizes light to provide complete electrical isolation between input and output.

An object of the present invention therefore is to provide an improved data transfer system having electrical isolation between input and output.

Another object of this invention is to provide an improved data transfer system wherein incoming signals can be rerouted through the device electronically.

Another object of the invention is to provide means for the accumulation of data at a utilization point through a single channel from multiple locations.

Another object of this invention is to provide an improved electro-optical data storage system having means for correlating the various words recorded in digital form.

Other objects and features of the present invention will be made apparent from the following specification when read in conjunction with the attached drawings of which:

Figure 1:
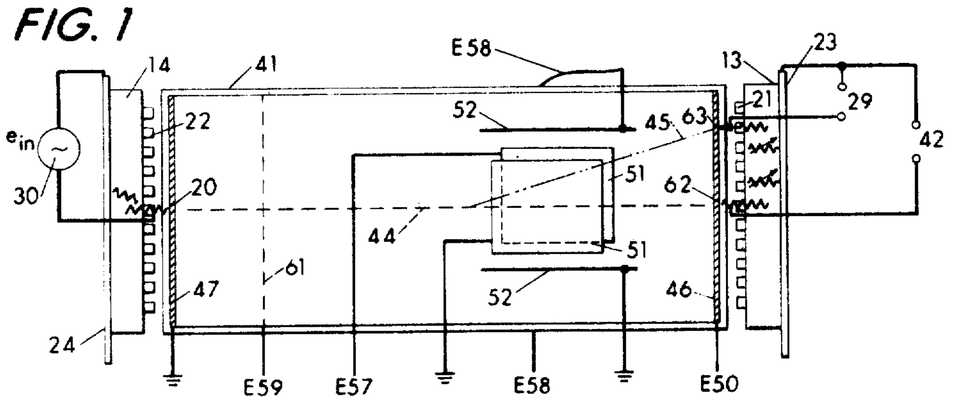
FIG. 1 is a sectional view which shows an embodiment of this invention.

Referring to FIG. 1 an embodiment of the invention is shown. The invention consists of three parts: an electroluminescent matrix section, an electronic control section, and a photoresistant matrix section. An input signal causes a spot on the electroluminescent section to generate a discrete light source which causes a stream of electrons to be released in the electronic control section which in turn reduce the resistance in a spot on the photoresistance section thus providing an output.

Layer 14 is an electroluminescent material. Etched on one side of layer 14 are strips of conductors 24 which form a series of columns in a matrix. On the other side of layer 14 are etched a series of electrical conductors 22. Electrical conductors 22 form rows opposite columns 24 and at right angles thereto thus completing the input matrix. Conductors 22 are made of a thin film of gold or platinum which are transparent to light or are properly etched to permit light to pass between conductors. Electroluminescent matrix panels as described above are commercially available according to engineering specifications from Sylvania Electric Products, Inc. These devices are an outgrowth of the "panelescent" lamp.

Tube 41 is the electronic control section which is an image converter tube with a deflection system. Photoemissive surface 47 within the tube emits electrons. Phosphorescent screen 46 receives electrons. A bias voltage E50 accelerates emitted electrons from surface 47 to surface 46. Bias voltage E50 is a positive voltage of a magnitude specified by the geometry of the tube. Control grid 61 has a small negative voltage E59 which prevents random electrons from being accelerated toward surface 46. The element 61 includes conventional electron focusing means.

Vertical deflection plates 52 and horizontal deflection plates 51 together with appropriate deflection voltages E57 and E58 define an electrostatic deflection system wellknown in the art which permits deflection of streams of electrons flowing from surface 47 to 46 in the usual manner. A magnetic deflection system may be substituted without altering the principles of the present invention. Magnetic deflection may be more appropriate for use with a commercially available tube. Since magnetic deflection coils may be mounted externally, the internal structure of the tube need not be changed.

Layer of material 13 is a photoresistive material normally cadmium sulfide. Other photoresistive material may be substituted for cadmium sulfide and a photovoltaic material may also be employed successfully. Cadmium sulfide is suggested because it will work effectively with high speed phosphors utilized at surface 46. High speed phosphors flouresce in the blue/green and ultra-violet regions and have very short persistence times. These phosphors are designated in the industry as P15 or P16 phosphors.

Layer 13 has etched thereon rows 21 on the surface nearest tube 41 and columns 23 on the opposite surface and at right angles to said rows thus forming an output matrix. The rows and columns are again thin films of gold or platinum, the inner surface nearest tube 41 being transparent or so arranged as to permit light to pass therethrough.

An electrical input voltage 30 applied across a preselected row and a preselected column causes current to pass through luminescent material between the point on the matrix where the row and column cross one another. The current produces a discrete light source or input signal at 20.

Spot of light 20 generated in electroluminescent matrix 14 passes into image converter tube 41 and impinges on a spot of photoemissive layer 47 within the tube. With proper bias within the tube a stream of electrons 44 is released at surface 47 and accelerated toward and finally strikes phosphorescent screen 46 causing a spot of light to be generated at point 62. The discreate light output passes out of tube 41 and impinges on photoresistive material 13 adjacent thereto. A column 23 and a row 21 intersect at the point of illumination of photoresistive material 13. Accordingly between the intersection of rows and columns a switch action is produced. When the spot is not illuminated a high resistance path lies between the row and column. When the spot is illuminated the high resistance path is converted into a low resistance path.

If it is desired, with the same input as above the stream of electrons 44 can be shifted up and shown as stream of electrons 45 by varying the bias on horizontal plates 52. Accordingly a new spot 63 on photoconductive material 13 is illuminated rather than point 62. It is seen that input signals can be diverted up or down to any preselected row or left or right to any preselected column. The feature that has just been described in detail will permit rechannelling of telephone calls when the above described embodiment is used as a crossbar switching system. Instead of having a switch close at output 42 a switch at output 29 closes by merely varying the bias voltage on vertical deflection plates 52.

Figure 2:
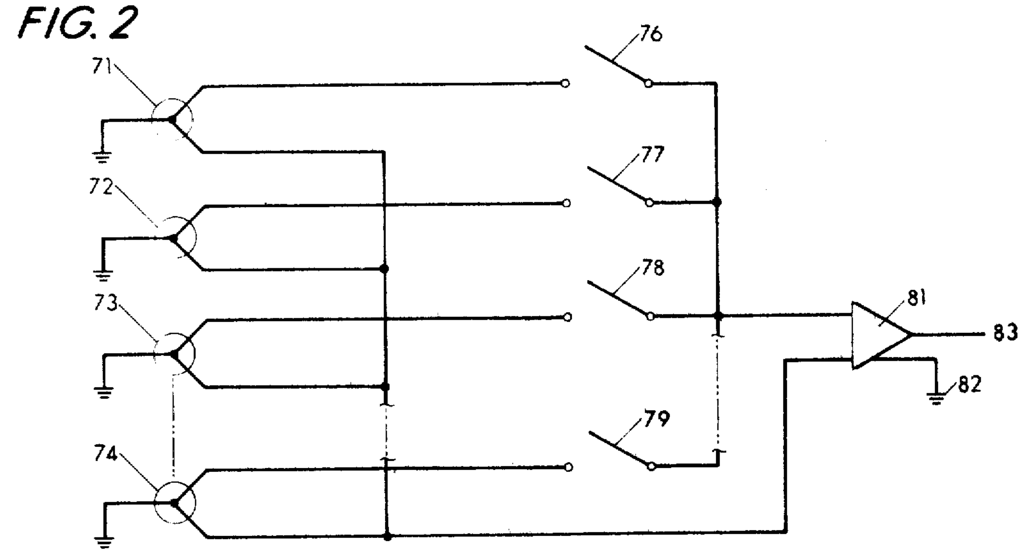
FIG. 2 is a schematic diagram which illustrates a suggested application of the present invention for data collection.

Referring to FIG. 2, data are accumulated systematically at various points and are transferred by way of a single channel to a distant point of utilization by sequential switching provided by the present invention. Depending upon the number of data points and the distance between the sources of data and the point of utilization substantial savings can be realized with the present invention. For example, a turbine in a power plant may have a plurality of remote points that must be temperature monitored continuously. The turbine guage board or data utilization point may be quite remote from the turbine. The cost of providing individual channels for each thermocouple would be prohibitive, accordingly a single channel is required.

A multiplicity of thermocouples 71, 72, 73 and 74 are shown. Switches 76, 77, 78, 79 correspond with junctions between row and column conductors on the output matrix as, e.g., 42 and 29 of FIG. 1. A D-C amplifier 81 and a single channel 83 to some distant point of utilization is shown.

Switches 76, 77, 78, 79 are sequentially closed in the output matrix by way of remote input signals applied to input matrix of FIG. 1. The information at each thermocouple station 71, 72, 73 and 74 is sequentially transferred by way of D-C amplifier 81 and single channel 83 to a common remote point of utilization.

It is of interest that remote input control signals are typically connected to a common ground. This "ground" potential is characteristically different from that of the thermocouple amplifier and its associated thermocouples. In contrast with other electrical systems using, e.g., solid state switches for selecting a given thermocouple output, here the input control circuit is electrically isolated from the switching circuit, thus preventing circulating ground loop currents.

Figure 3:
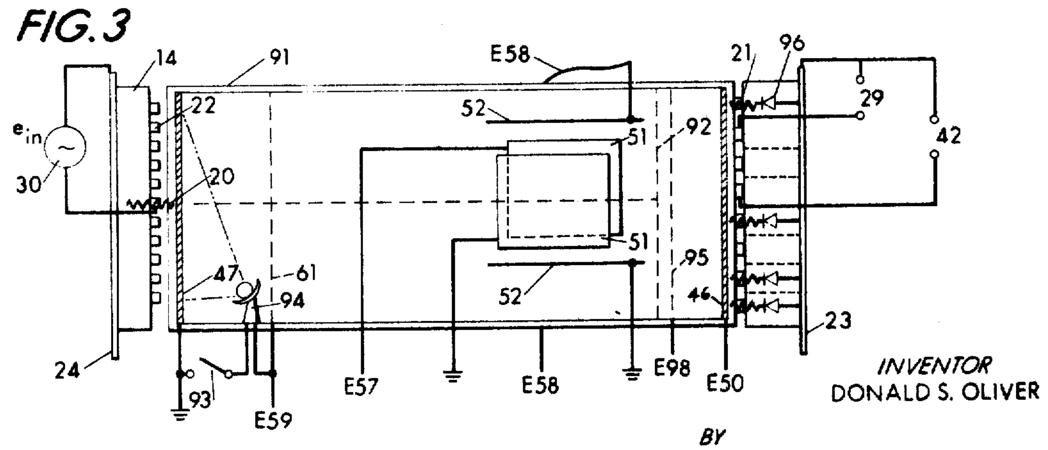
FIG. 3 is a sectional view which shows another embodiment of this invention having data storage capability.

Referring to FIG. 3 another embodiment of the present invention is shown. This embodiment provides means for data storage. It also provides means for read-out at right angles to the read-in matrix. Data can be read in row by row and read out column by column as noted above. A diode matrix using photorectifiers is utilized to prevent false output readings due to spurious interactions between row conductors and column conductors.

The embodiment shown in FIG. 3 is identical in every respect to that shown in FIG. 2 except for the following: A light 94 has been added for illuminating photoemissive surface 47. Electrostatic memory grid 92 together with control grid 95 have been added; and a system of photorectifiers 96 has been substituted for photoconductive material 13.

The photorectifiers 96 may be formed in a matrix of discrete rectifiers indicated by the dotted lines. The material is normally an insulator. When exposed to a discrete light signal, a corresponding discrete diode is produced. The row conductors 21 are transparent to light. When a selected junction is illuminated by a discrete light signal from the phosphor 46, a diode is effectively connected between a row conductor 21 and column conductor 23 at the selected junction. The pattern of diodes 96 produced corresponds with the electrostatic signals stored on the screen 92. The screen 92 may be erased to remove a given signal pattern by applying an appropriate voltage between the screen 92 and the grid 95. The pattern of diodes may be readily changed electrically by erasing the screen 92 and introducing a new pattern of input signals into the input matrix.

Input signals applied to the input matrix cause streams of electrons to pass across the image tube as was accomplished in the previous embodiment. However a control voltage applied to control grid 95 intercepts the electrons preventing them from striking phosphorous screen 46. Screen 92, which is insulated, senses the electrons stream and stores electrostatically a voltage pattern corresponding to the input signal applied. Then a pattern of signals is written on storage screen 92. The control voltage is then removed from control grid 95. Light 94 is switched on flooding photoemissive surface 47 causing a flood of electrons to be emitted and head toward phosphor screen 46. Memory grid 92 causes the electrostatically stored signals thereon to retard certain streams of electrons thereby permitting phosphor screen 46 to emit a pattern of light corresponding to the signal stored on memory grid 92.

The pattern of discrete light signals produces a like pattern of photorectifiers to be illuminated. The diode matrix thus formed may be addressed to provide a read out pattern of "ones" and "zeros" in the output. The diode pattern shown corresponds with the code 10001011.

In this diode matrix current can only pass from columns to rows and not in the reverse direction, thus preventing spurious interactions tending to produce spurious output signals. The present invention utilizes photorectifiers. Photorectifiers are non-conductive in the dark and act as a diode in the light. Photodiodes on the other hand are diodes in the dark and conductors in the light. A description of photorectifiers can be found in Photoelectric Materials and Devices published by Van Nostrand 1965 and edited by Simon Lavach at page 290. Photorectifiers are small and quite amenable to integrated circuit techniques. The photorectifier matrix may be formed by connecting the row conductors 21 and column conductors 23 to a matrix of interconnected discrete photorectifier elements.

Figure 4:
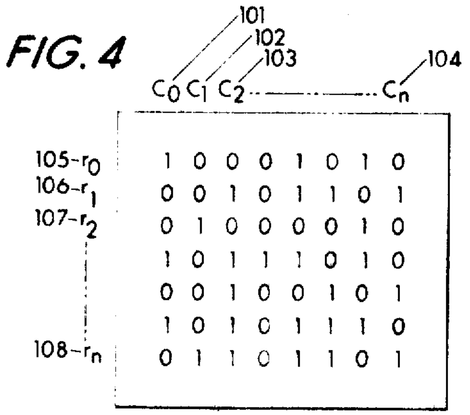
FIG. 4 is a word list in digital form.
Figure 5:
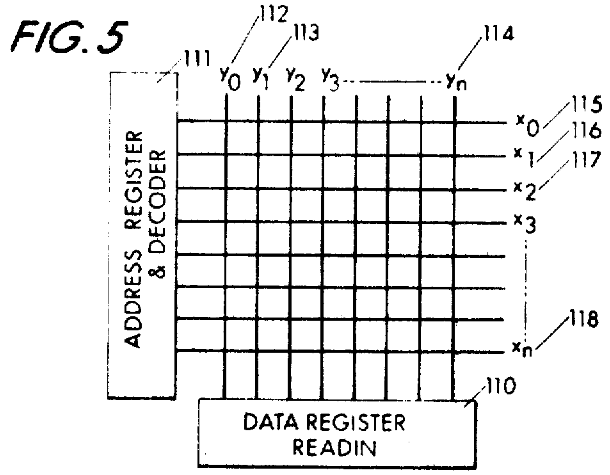
FIG. 5 is a data matrix which illustrates read-in in the present invention.
Figure 6:
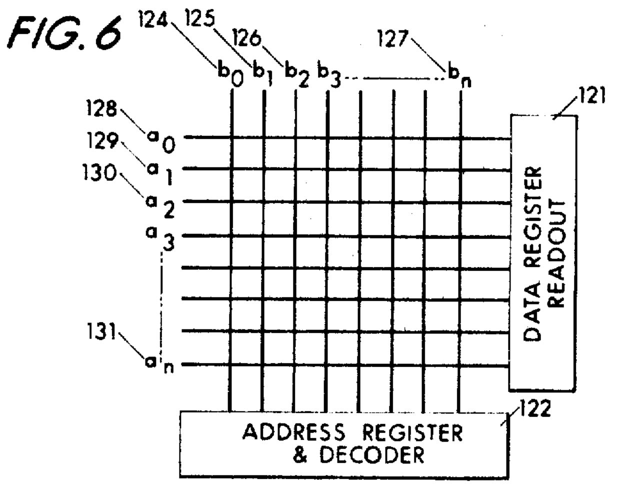
FIG. 6 is a data matrix which illustrates read-out at right angles.

To illustrate the principles of the present invention with reference to the embodiment shown in FIG. 3 reference is had to FIGS. 4, 5, and 6. Referring to FIG. 4 a series of words are written from left to right in digital form in rows 105 to 108. Columns 101 through 104 represent these parts of each word as column 101 represents the first part of each word and so forth.

Data is read into the input matrix as shown in FIG. 5 sequentially by first energizing row $X_0$ 115 by means of address register 111. Data register 110 transfers the word to $X_0$. The address register then energizes a second row 116 and a second word is transferred to row $X_1$ and so forth until a series of words are written as shown in FIG. 4.

Read-out may be accomplished at the output matrix as was explained above after read-in is completed by removing the control voltage from grid 95 and switching light 94 on. The address register 122 energizes a column 124 and the word is read out at 121. It can be seen that data can be read out as shown in FIG. 6 as well as in the normal fashion. The ability to read out at right angles permits cross correlations to be made between rows checked out column by column. The outputs at 121 correspond with columns 101–104 in FIG. 4 taken a column at a time. The present invention thus provides a simple means of correlating a quantity of data by reading in words row by row and reading these words out column by column.

It will be apparent to those skilled in the art that the embodiment of FIGURE 3 may be useful in the field of Telephony. A plurality of sequentially generated electron streams may be individually and selectively positioned by the deflection plates to impinge upon selected crosspoints of the storage grid to produce any desired pattern of "closed" crosspoints in the output matrix. Any desired pattern of light points may be rapidly generated, erased, altered, and regenerated very rapidly and consequently thousands of different matrix switching patterns may be produced with a single device, which patterns may be utilized for code conversion or crossbar switching. The voltage applied to the deflection circuitry may be readily adjusted to ensure proper coincident registration of the light point pattern with the output matrix crosspoints. Complete electrical isolation between the input control matrix and the output matrix is assured.

What is claimed is:

1. An electro-optical system comprising:
- a luminescent matrix for producing discrete light signals at preselected points on said matrix in accordance with designated input signals;
- means for converting said light signals into streams of charged particles;
- means for controlling the intensity and direction of said streams of charged particles;
- means for converting said streams of charged particles into discrete light signals;
- matrix means responsive to said discrete light signals; and
- means for utilizing the photo effect produced by said discrete light signals at designated points on said matrix.

2. An electro-optical system according to claim 1, wherein:
- said charged particles are electrons.

3. An electro-optical system according to claim 2, wherein:
- said matrix means responsive to said discrete light sources includes photoconductive material interposed between the rows and columns of said matrix.

4. An electro-optical system according to claim 2, wherein:
- said matrix means responsive to said discrete light sources includes photorectifiers interconnecting the rows and columns of said matrix at preselected points.

5. An electro-optical system according to claim 4, wherein:
- means are included for electrostatically storing signals received in said systems through said electro-luminescent material; and means are included for flooding said storage means with electrons whereby said means for converting electrons into discrete light sources produces beams of light in a pattern in accordance with signals stored on said storage means.

6. An electro-optical system in accordance with claim 2, wherein:
- said means for controlling the intensity and direction of said streams of electrons includes an electrostatic deflection system.

7. An electro-optical system in accordance with claim 6, wherein:
- said means for converting streams of electrons into discrete light signals is a preselected phosphor having a low persistence time.

8. An electro-optical system in accordance with claim 3, wherein:
- said photoconductive material is cadmium sulfide.

9. An electro-optical system in accordance with claim 2, wherein:
- said means for utilizing the photo effect produced by said discrete light signals include a multiplicity of thermocouples, D-C amplifying means, data accumulating means, said thermocouples, photoconductive matrix D-C amplifier, and data accumulator are electrically interconnected in a preselected manner, said thermocouples sequentially switched by said photoconductive matrix whereby readings of said thermocouples are stored in said data accumulator.

10. An electro-optical system in accordance with claim 2, wherein:
- said means for controlling the deflection of said stream of electrons includes a magnetic deflection system.

11. An electro-optical system according to claim 4, wherein:
- said rows on said photorectifier matrix are at right angles to said rows of said electroluminescent material.

References Cited

UNITED STATES PATENTS

| | | | |
|---|---|---|---|
| 2,972,082 | 2/1961 | Kallmann et al. | 315—10 |
| 3,073,989 | 1/1963 | Amsterdam | 315—8.5 |
| 3,333,146 | 7/1967 | Dill et al. | 315—21 |

DONALD J. YUSKO, Primary Examiner

U.S. Cl. X.R.

315—8.5, 21